Nov. 7, 1967     H. LEUNIG ETAL     3,350,887
TWO-STAGE ROCKET PROPULSION SYSTEM
Filed March 6, 1964     2 Sheets-Sheet 1
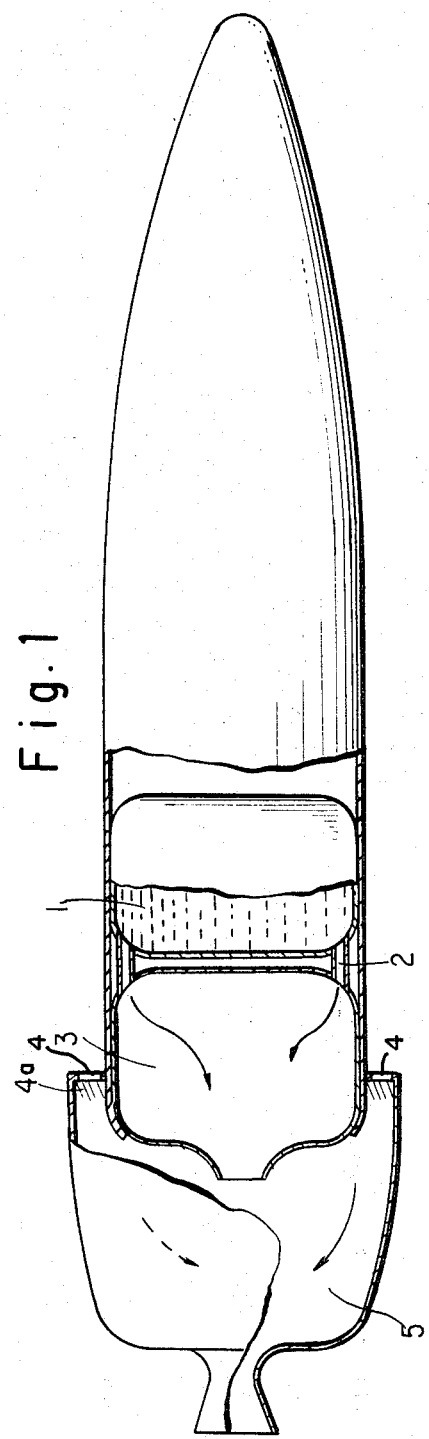
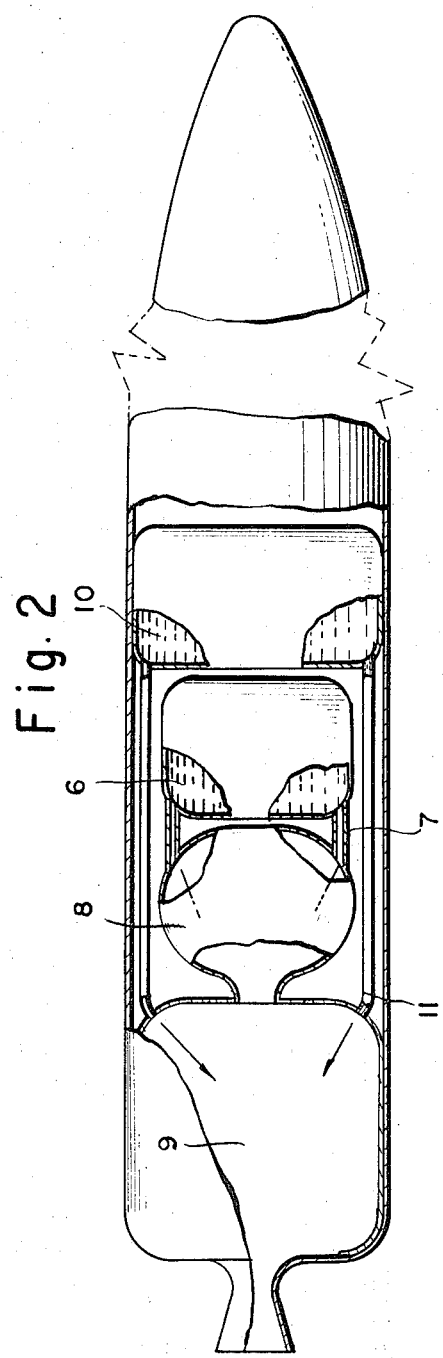
INVENTORS.
HEIMBERT LEUNIG
RUDOLF MEYER
BY EBERHARD BUCHNER
ATTORNEYS

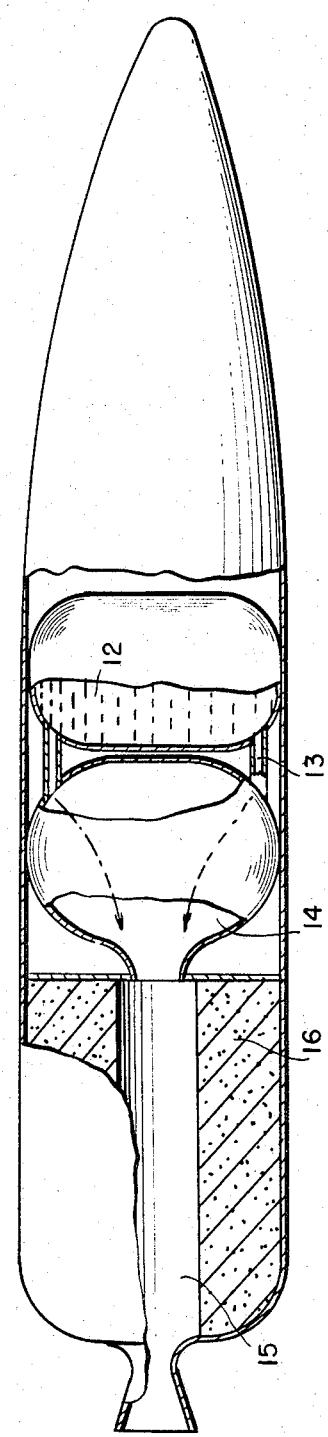
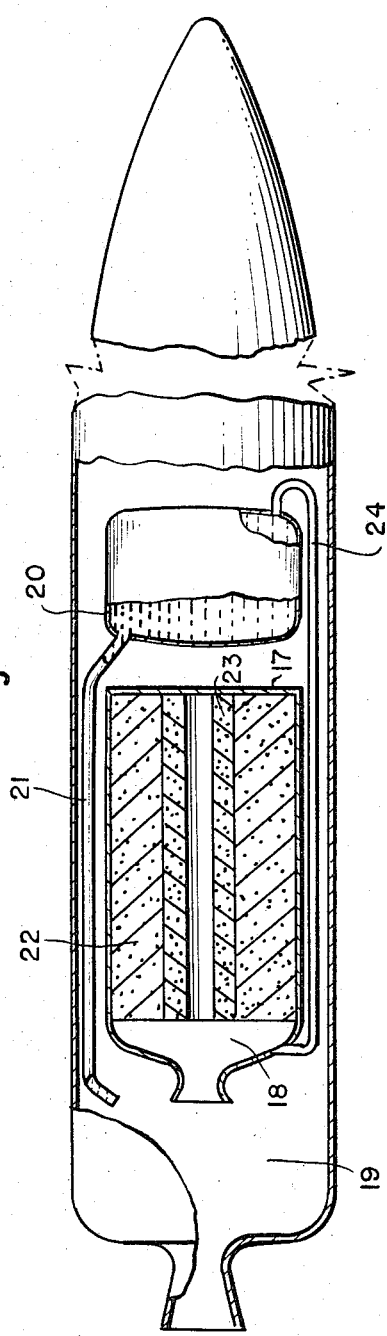
INVENTORS
HEIMBERT LEUNIG
RUDOLF MEYER
BY EBERHARD BUCHNER
ATTORNEYS

United States Patent Office 3,350,887
Patented Nov. 7, 1967

3,350,887
TWO-STAGE ROCKET PROPULSION SYSTEM
Heimbert Leunig, Essen-Bredeney, Rudolf Meyer, Essen, and Eberhard Buchner, Walkdraiburg, Germany, assignors to Wasag-Chemie, A.G., Essen, Germany, a corporation of Germany
Filed Mar. 6, 1964, Ser. No. 350,050
Claims priority, application Germany, Mar. 9, 1963, W 34,077
3 Claims. (Cl. 60—251)

ABSTRACT OF THE DISCLOSURE

The disclosure relates to a two-stage propulsion system comprising a thermal decomposition chamber for producing a propulsion gas in the absence of oxygen and a combustion chamber for oxidizing said propellant gas.

---

The invention relates to a novel two-stage propulsion system comprised of a first stage which produces a propellant gas in the absence of oxygen and a second stage wherein the propellant gas is subjected to oxidation.

The two basic types of rockets are solid rockets and liquid rockets and there are a few known combination types which operate with different systems. In the hybrid propulsion system (split rocket), a solid propulsion composition rich in fuel is combined with a liquid oxidizer to obtain advantages such as controllability, easy handling, etc. of both systems. However, in hybrid systems it is difficult to obtain a uniform or controllable reaction over the entire period of combustion of the components which in many instances are not compatible with each other.

Other propulsion systems are known such as the "ducted" rocket wherein a solid propellant composition is combined with a pressure head system to avoid stress upon the system by the concurrent feed of oxygen. Another proposed system is a two-stage system wherein a solid propellant is used in the first stage as well as in the second, pressure head stage.

It is an object of the invention to provide an improved two-stage propulsion system wherein the control of combustion is simplified and adjustable.

It is another object of the invention to provide a novel two-stage propulsion system which generates a greater amount of gas and therefore a greater amount of power.

These and other objects and advantages of the invention will become obvious from the following detailed description.

The novel two-stage rocket propulsion system of the invention is comprised of a first stage wherein a propulsion gas is generated from a substantially oxygen-free propellant and a second stage wherein the propulsion gas from the first stage is subjected to oxidation to release further energy by the heat of reaction.

The substantially oxygen-free propellant is preferably an endothermic thermodecomposing compound which furnishes gases with a high K-value ($C_p/C_v$). Examples of suitable propellants are unsaturated hydrocarbons having up to 12 carbon atoms such as 1,3-butadiene, cyclopentadiene and dialkine; hydrazine, borohydride, lithium hydrides, aluminum boranate, lithium aluminum hydride, aluminum borohydride and lithium borohydride.

The propellant charge for the first stage may be composed of two components, namely at least 60–100% of the endothermic decomposing compound and 0 to 40% of an initiator or explosive substance which provides the necessary activation energy for the decomposition of the endothermic component. The said explosive substance preferably has an equalized oxygen balance or a deficiency of oxygen such as energy-rich nitroglycerin powder. The charge may be prepared so that the two components are in direct contact with each other and are in a self-supporting form. Instead of using an initiator component, an electrical spark may be used as the initiating means.

The still reactive gases generated in the first stage are burned or oxidized in the second stage with oxidizers whereby the gases become substantially enriched in energy by the heat of reaction. The ignition may be effected by self-ignition and the system may be varied in many different ways.

Examples of suitable oxidizers in the second stage are oxygen carriers such as highly concentrated nitric acid, nitrogen tetraoxide, hydrogen peroxide, nitrates such as ammonium nitrate (solid or solution), perchlorates such as nitrosyl perchlorate, etc.; oxygen-free oxidizers such as liquid fluorine, perchloryl fluoride, chloro trifluoride, nitrogen trifluoride, etc. and liquid oxygen or air supplied by the pressure head principle. If liquid oxygen carriers are used, they may also be used for coating the discharge jet.

The two-stage rocket propulsion system of the invention has the advantage that propulsion components which cannot be mixed together without reacting with each other can now be used in the same system. One component will decompose in the first stage and the decomposition gases will be combined with the second reactant in the second stage whereby all the available energy will be used. Also, an increased output is achieved by the use of substantially oxygen-free endothermic propellants which upon decomposition furnish a large amount of low molecular weight gases which have a larger volume and hence greater power.

The propulsion system of the invention also has the advantages of lower operating temperatures and a pressure differential between the two stages which serves to transport the fuels. Moreover, the control of the course of combustion in the second stage is easily controlled by regulating the supply of the oxidizers thereto which accordingly adjusts the thrust of the system.

Referring now to the drawings:

FIG. 1 illustrates one embodiment of the invention using the ram-jet principle in the second stage.

FIG. 2 illustrates an embodiment of the invention wherein a liquid oxidizer is used in the second stage.

FIG. 3 illustrates another embodiment of the invention in which a solid oxidizer is used in the second stage and FIG. 4 illustrates an embodiment of the invention with a solid fuel in the first stage and a liquid oxidizer.

In the embodiment of FIG. 1, fuel container 1 of the first stage contains hydrazine which is transported by injection system 2 into the first stage combustion chamber 3. The hydrazine decomposes in combustion chamber 3 and generates an increase in pressure of between 5 and 50 atmospheres absolute. The gases pass from combustion chamber 3 to the second combustion chamber 5 which operates on the ram-jet principle and has a chamber pressure of 2 atmospheres absolute. In combustion chamber 5, there are aspiration apertures 4 which supply air. At the start of the operation of the rocket, the apertures 4 are closed with an oxidizer 4a which reacts with the decomposition products of the first stage so that the apertures open when the rocket has acquired a sufficient velocity. The release pressure depends upon the altitude pressure and the jet nozzle design is adapted to a median altitude of about 8 km. This technical arrangement permits an increase of the specific impulses because the oxygen required in the second stage does not have to be carried in the vehicle.

The embodiment of FIG. 2 is useful when a liquid oxidizer is employed in the second stage. The fuel container 6 of the first stage contains hydrazine which is passed by injection system 7 into the first stage combustion chamber 8. The decomposition of the hydrazine generates a pressure between 50 and 300 atmospheres absolute in the combustion chamber 8. Container 10 contains a liquid oxidizer such as nitric acid, nitrous tetraoxide, or fluorine, nitrogen trifluoride or $FClO_4$ which is passed by injection system 11 into the second stage combustion chamber 9. The injection system 11 can be operated by known means such as propulsion of a pump system by means of a turbine with a portion of the gases of the first stage and the liquid oxidizer also serves as a cooling means for the combustion chamber 9. The pressure in the second stage combustion chamber 9 is between 10 and 100 atmospheres absolute and the said pressure may be released through a Laval nozzle to 0.1 to 2 atmospheres absolute.

The embodiment of FIG. 3 shows the use of a solid oxidizer in the second stage. Fuel container 12 of the first stage contains 1,3-butadiene which is passed by injection system 13 to the first stage combustion chamber 14 wherein the decomposition of 1,3-butadiene creates a pressure of 50 atmospheres absolute. In the second stage, solid nitrosyl perchlorate is shaped in the form of a tube 16 whose center 15 is the second stage combustion chamber. The pressure in the second stage combustion chamber is about 10 absolute atmospheres and the said pressure may be released through a Laval nozzle to 0.1 to 2.0 atmospheres absolute. The said arrangement has the advantage that the second stage ceases to burn as soon as the first stage is shut off.

In the embodiment of FIG. 4, fuel container 17 of the first stage contains solid lithium alanate 22 in tube form with a small amount of a POL-propellant 23 along the inside thereof which acts as the initiator for the decomposition of the endothermic decomposing fuel. The pressure in the first stage combustion chamber 18 is about 50 atmospheres absolute. The liquid oxygen in container 20 is forced through line 21 into the second stage combustion chamber 19 by the pressure differential of about 30 atmospheres absolute between pressure line 24 from combustion chamber 18 and feed line 21 since the pressure in combustion chamber 19 is about 20 atmospheres absolute. The said gas is released through a Laval nozzle to a pressure of about 0.1 to 2 atmospheres absolute.

The said propulsion system is preferably used for rocket propulsion and the ranges of the rockets can be varied over a wide range depending upon the specific impulse and the average propellant density. Because of the increased choice of fuel components, it is also possible to achieve an effective increase in the average fuel density.

Various modifications of the two-stage system of the invention may be made without departing from the spirit or scope thereof and it is to be understood that the invention is to be limited only as defined in the appended claims.

We claim:
1. A two stage propulsion system in combination comprising a source of a substantially oxygen-free thermally decomposable propellant, a thermal decomposition chamber and means to provide the activation energy for decomposition of the propellant wherein the said propellant is thermally decomposed to generate a propulsion gas, means connecting the soource of said propellant and the thermal decomposition chamber, means for passing the propulsion gas from the thermal decomposition chamber to a combustion chamber, a said combustion chamber provided with aspiration apertures which supply air by the ram jet principle, a solid oxidizer closing said apertures which reacts with the propulsion gas thereby opening the apertures and a nozzle means connected to the combustion chamber to discharge and expand the oxidized propulsion gas.

2. A two-stage propulsion system in combination comprising a source of substantially oxygen-free, thermally decomposable aluminum borohydride propellant, a thermal decomposition chamber and means to provide the activation energy for decomposition of the propellant wherein the said propellant is thermally decomposed to generate a propulsion gas, means connecting the source of said propellant and the thermal decomposition chamber, means for passing the propulsion gas from the thermal decomposition chamber to a combustion chamber, said combustion chamber provided with solid nitrosyl perchlorate as an oxidizer which reacts with the propulsion gases and a nozzle means connected to the combustion chamber to discharge and expand the oxidized propulsion gas.

3. A two-stage propulsion system in combination comprising a thermal decomposition chamber containing a solid, substantially oxygen-free, thermally decomposable propellant and an initiator substance to provide the activation energy for decomposition of the propellant to generate a propulsion gas, means for passing the propulsion gas from the thermal decomposition chamber to a combustion chamber, said combustion chamber connected to a source of an oxidizer wherein the propulsion gas is oxidized by the said oxidizer and a nozzle means connected to the said combustion chamber to discharge and expand the oxidized propulsion gas.

References Cited
UNITED STATES PATENTS

| | | | |
|---|---|---|---|
| 2,952,122 | 9/1960 | Fox | 60—35.6 |
| 2,987,875 | 6/1961 | Fox | 60—35.6 |
| 3,101,592 | 8/1963 | Robertson et al. | 60—35.6 |
| 3,107,485 | 10/1963 | Toulmin | 60—35.6 |
| 3,132,475 | 5/1964 | Hopper | 60—35.6 |
| 3,136,119 | 6/1964 | Avery | 60—35.6 |
| 3,147,592 | 9/1964 | Rose | 60—39.46 |
| 3,149,460 | 9/1964 | La Rocca | 60—39.46 X |
| 3,173,249 | 3/1965 | Wiggins | 60—35.6 |
| 3,230,701 | 1/1966 | Mullen et al. | 60—35.4 |

CARLTON R. CROYLE, *Primary Examiner.*

MARK NEWMAN, *Examiner.*